US008570971B2

(12) United States Patent
Bhattad et al.

(10) Patent No.: US 8,570,971 B2
(45) Date of Patent: Oct. 29, 2013

(54) SYSTEMS AND METHODS FOR CONFIGURING REMOTE RADIO HEADS

(75) Inventors: Kapil Bhattad, Karnataka (IN); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/463,663

(22) Filed: May 3, 2012

(65) Prior Publication Data

US 2013/0021986 A1 Jan. 24, 2013

Related U.S. Application Data

(60) Provisional application No. 61/483,356, filed on May 6, 2011.

(51) Int. Cl.
 *H04W 4/00* (2009.01)
(52) U.S. Cl.
 USPC ........................................ 370/329; 455/422.1
(58) Field of Classification Search
 None
 See application file for complete search history.

(56) References Cited

U.S. PATENT DOCUMENTS

| 2010/0254338 A1 | 10/2010 | Tanaka |
| 2010/0273471 A1 | 10/2010 | Meshkati et al. |
| 2011/0038310 A1* | 2/2011 | Chmiel et al. ................. 370/328 |
| 2011/0149878 A1 | 6/2011 | Ahmadi et al. |
| 2011/0312316 A1* | 12/2011 | Baldemair et al. ......... 455/422.1 |
| 2012/0207105 A1* | 8/2012 | Geirhofer et al. ............. 370/329 |
| 2012/0213108 A1* | 8/2012 | Ji et al. ......................... 370/252 |
| 2012/0213109 A1* | 8/2012 | Xu et al. ....................... 370/252 |
| 2012/0236741 A1* | 9/2012 | Xu et al. ....................... 370/252 |
| 2012/0281554 A1* | 11/2012 | Gao et al. ...................... 370/252 |
| 2012/0281555 A1* | 11/2012 | Gao et al. ...................... 370/252 |
| 2013/0010619 A1* | 1/2013 | Fong et al. .................... 370/252 |
| 2013/0021926 A1* | 1/2013 | Geirhofer et al. ............. 370/252 |
| 2013/0028182 A1* | 1/2013 | Geirhofer et al. ............. 370/328 |

FOREIGN PATENT DOCUMENTS

WO 2009130199 A1 10/2009

OTHER PUBLICATIONS

Tiwari, "WIMAX 2.0 for Operators," Mar. 24, 2010, pp. 1-31, published by wvvw.beyond4g.org, Retrieved from the Internet at: http://www.beyond4g.org/wp-content/uploads/2010/03/WiMAX-2.0-for-operator-v1.0.pdf.
International Search Report and Written Opinion—PCT/US2012/036513—ISA/EPO—Aug. 13, 2012.

* cited by examiner

*Primary Examiner* — Clemence Han
(74) *Attorney, Agent, or Firm* — Seyfarth Shaw LLP

(57) ABSTRACT

In a method of wireless communication, a UE receives a configuration parameter for scrambling or descrambling a signal for which a larger number of scrambling sequences are defined for a particular cell ID for UEs of a newer release. The UE communicates in a network having a base station and remote radio head(s) based on the received configuration parameter.

28 Claims, 8 Drawing Sheets

SYSTEMS AND METHODS FOR CONFIGURING REMOTE RADIO HEADS

CROSS-REFERENCE TO RELATED APPLICATION

This application claims the benefit under 35 U.S.C. §119(e) to U.S. Provisional Patent Application No. 61/483,356 entitled "SYSTEMS AND METHODS FOR CONFIGURING REMOTE RADIO HEADS," filed on May 6, 2011, the disclosure of which is expressly incorporated by reference herein in its entirety.

BACKGROUND

1. Field

Aspects of the present disclosure relate generally to wireless communication systems, and more particularly to configuring remote radio heads in a wireless network.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In one aspect, a method of wireless communication is disclosed. The method includes receiving a configuration parameter for scrambling or descrambling a signal for which a larger number of scrambling sequences are defined for a particular cell ID for UEs of a newer release. The UE communicates in a network that includes a base station and remote radio head(s) based at least in part on the received configuration parameter.

Another aspect discloses wireless communication having a memory and at least one processor coupled to the memory. The processor(s) is configured to receive a configuration parameter for scrambling or descrambling a signal for which a larger number of scrambling sequences are defined for a particular cell ID for UEs of a newer release. The processor(s) is also configured to communicate in a network having a base station and remote radio head(s), based at least in part on the received configuration parameter.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of receiving a configuration parameter for scrambling or descrambling a signal for which a larger number of scrambling sequences are defined for a particular cell ID for UEs of a newer release. The program code also causes the processor(s) to communicate in a network having a base station and remote radio head(s). The processor(s) communicates based at least in part on the received configuration parameter.

Another aspect discloses an apparatus including means for receiving a configuration parameter for scrambling or descrambling a signal for which a larger number of scrambling sequences are defined for a particular cell ID for UEs of a newer release. Also included is a means for communicating in a network having a base station and remote radio head(s), based at least in part on the received configuration parameter.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
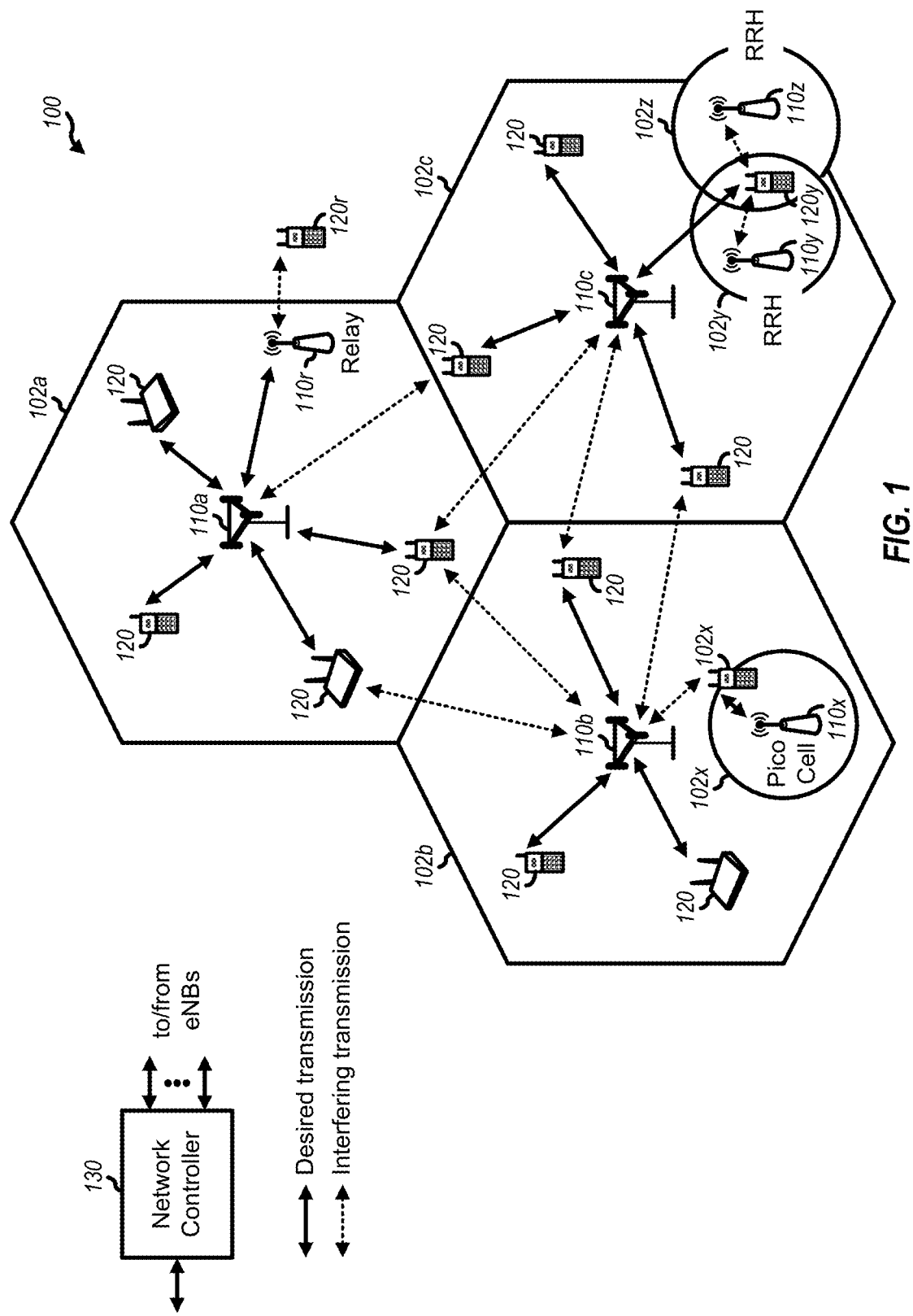
FIG. 1 is a block diagram conceptually illustrating an example of a telecommunications system.

FIG. 1 shows a wireless communication network 100, which may be an LTE-A network, including remote radio heads (RRHs). The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, remote radio heads (RRHs) and/or other types of cells. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. The pico may be connected to the macro via a backhaul. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). The RRHs are connected to the macro cell with a high speed connection, such as fiber, enabling fast communications and coordination between the macro cell and RRH as well as allowing for reliable configurations of the transmissions. An eNodeB for a macro cell may be referred to as a macro eNodeB. An eNodeB for a pico cell may be referred to as a pico eNodeB. Similarly, an eNodeB for a femto cell may be referred to as a femto eNodeB or a home eNodeB. And, an eNodeB for a RRH may be referred to as a remote radio head eNodeB, or simply as an RRH. In the example shown in FIG. 1, the eNodeBs 110$a$, 110$b$ and 110$c$ are macro eNodeBs for the macro cells 102$a$, 102$b$ and 102$c$, respectively. The eNodeB 110$x$ is a pico eNodeB for a pico cell 102$x$. The eNodeBs 110$y$ and 110$z$ are RRH eNodeBs for the cells 102$y$ and 102$z$, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110$r$ may communicate with the eNodeB 110$a$ and a UE 120$r$ in order to facilitate communication between the eNodeB 110$a$ and the UE 120$r$. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support the operation of synchronous macro cells and remote radio heads. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 (e.g., UE 120x, UE 120y, etc.) are dispersed throughout the wireless network 100, and each UE may be stationary or mobile. A UE may also be referred to as a terminal, a user terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a netbook, a smart book, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth.

Figure 2:
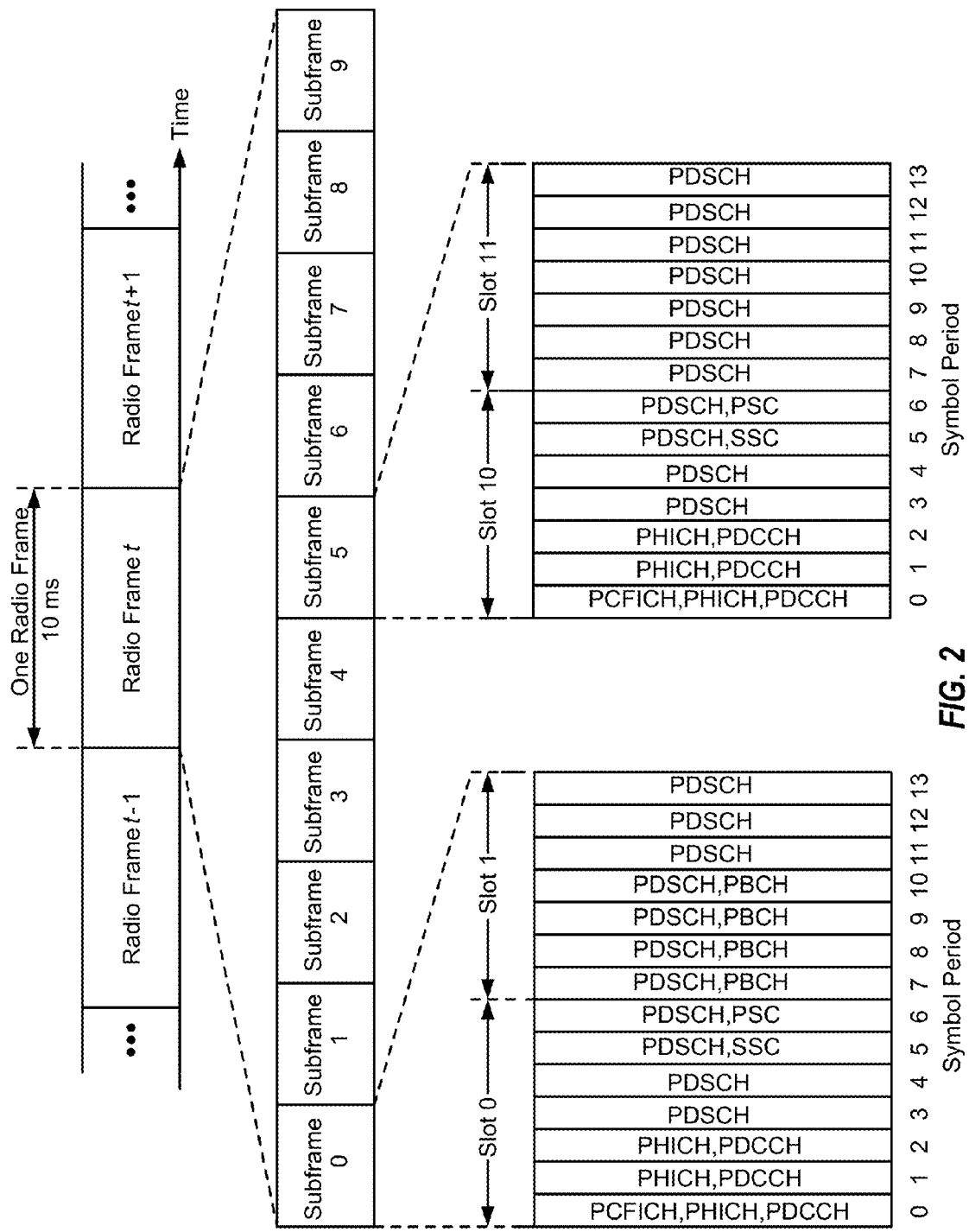
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic repeat request (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
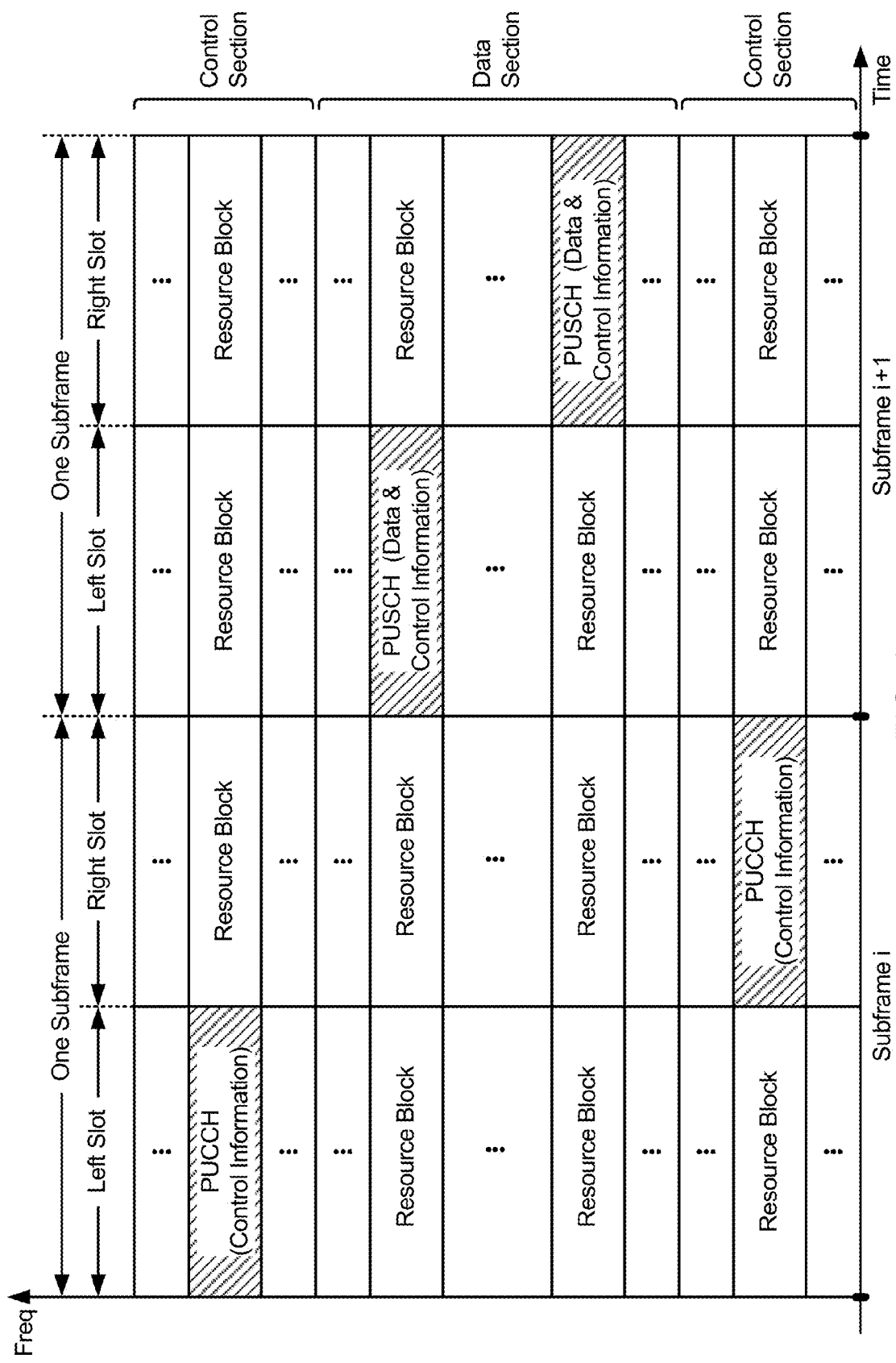
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC (primary synchronization carrier), SSC (secondary synchronization carrier), CRS (common reference signal), PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
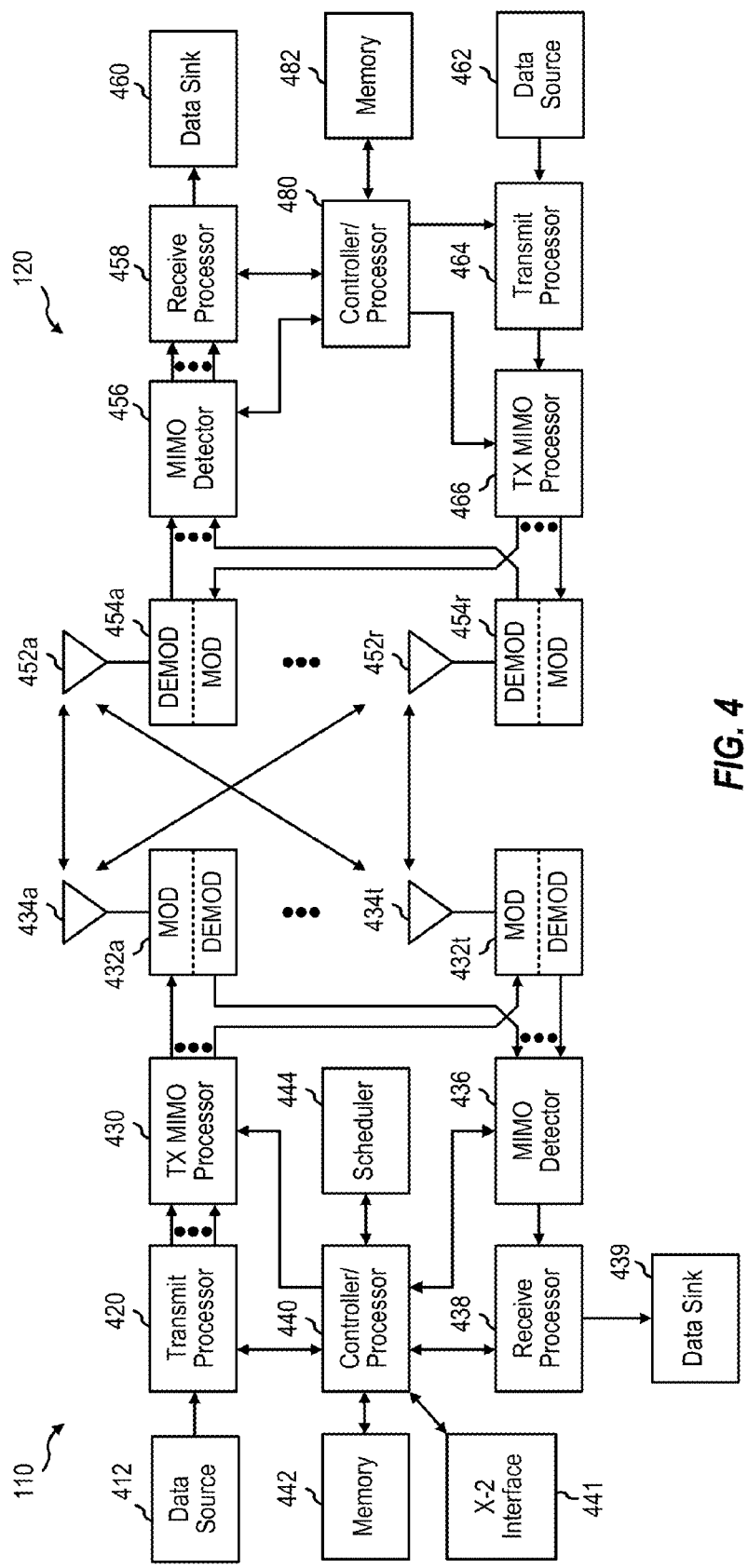
FIG. 4 is a block diagram conceptually illustrating a design of a base station/eNodeB and a UE configured according to one aspect of the present disclosure.
Figure 5:
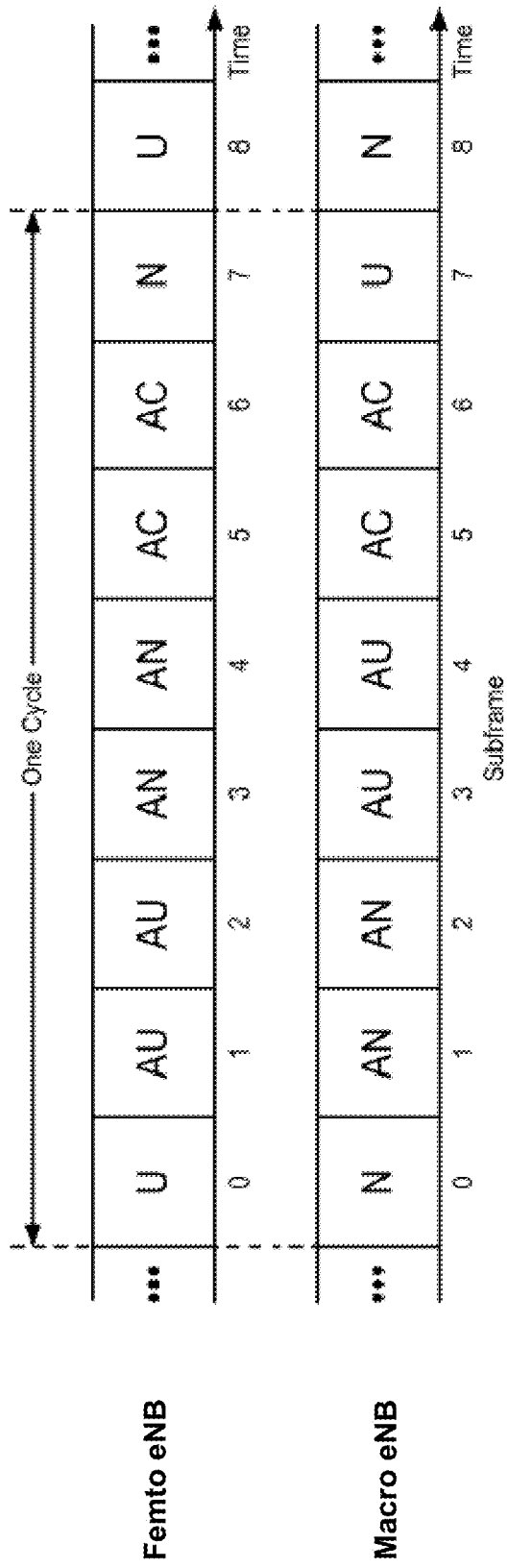
FIG. 5 is a block diagram conceptually illustrating adaptive resource partitioning in a heterogeneous network according to one aspect of the disclosure.

FIG. 4 shows a block diagram of a design of a base station/eNodeB 110 and a UE 120, which may be one of the base stations/eNodeBs and one of the UEs in FIG. 1. For example, the base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440/480 and/or other processors and modules at the base station 110/UE 120 may perform or direct the execution of the functional blocks illustrated in FIG. 7, and/or other processes for the techniques described herein. The memories 442 and 482 may store data and program codes for the base station 110 and the UE 120, respectively. A scheduler 444 may schedule UEs for data transmission on the downlink and/or uplink.

Figure 6:
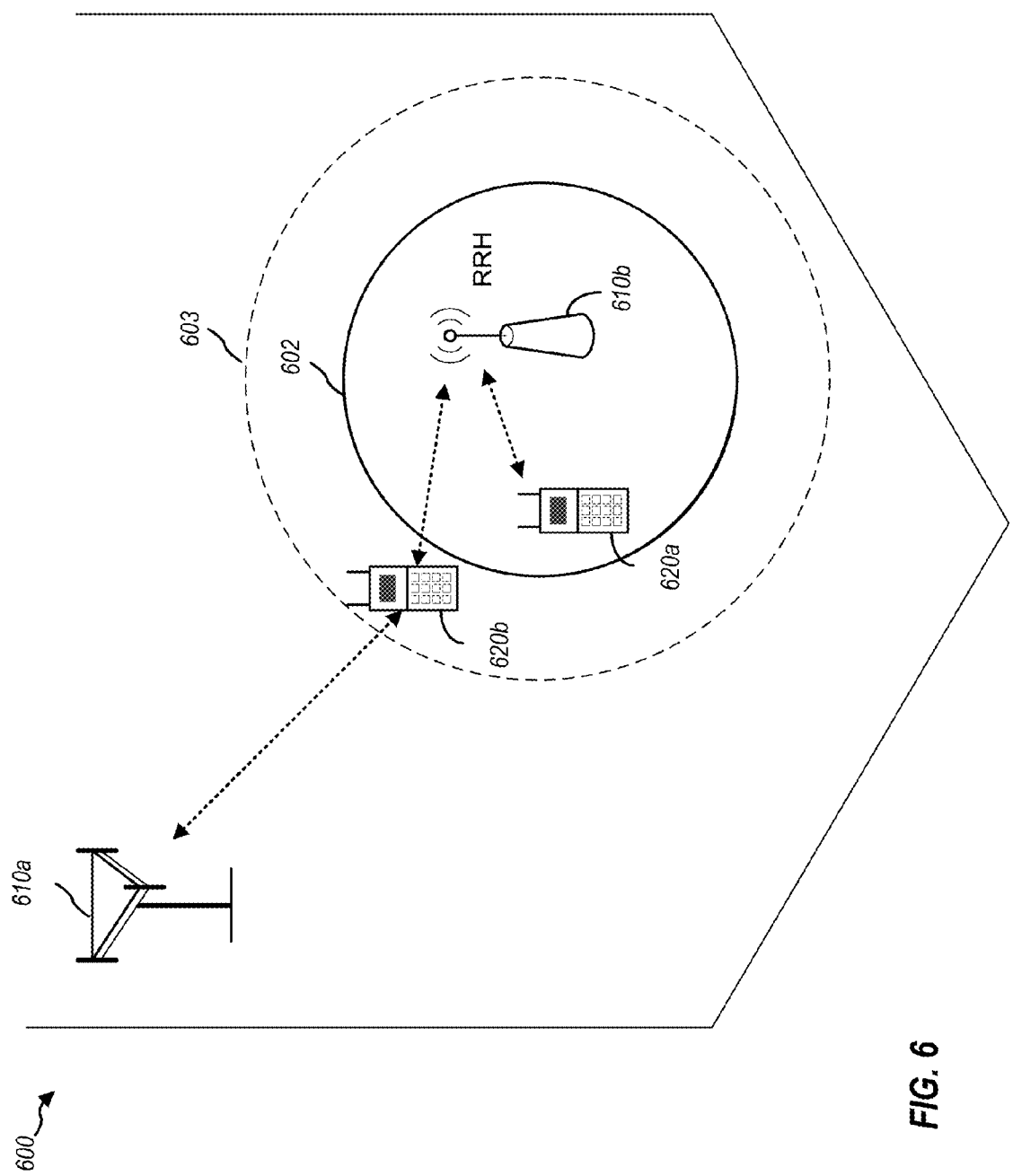
FIG. 6 is a block diagram illustrating range expansion in a wireless system.

As shown in FIG. 6, a network 600 supporting range expansion, may include a macro base station 610a and a remote radio head (RRH) 610b. In the region 602, the signal received by the UE 620a from the remote radio head 610b is stronger than the signal from the macro base station 610a. The region 602 is referred to as the remote radio head cell. The region 603 is the range expansion region of the remote radio head 610b. In the range expansion region 603, the received signal for the UE 620b is stronger from the macro base station 610a than from the remote radio head 610b. The area outside of the range expansion region 603 is the macro cell region. In one example, range expansion is performed for low power remote radio heads in a network configuration that includes a macro cell with a fast and reliable backhaul connection to low power remote radio heads (such as a fiber connection). The network 600 may also include high power remote radio heads, including those that share the same cell ID as the macro cell.

Aspects of the present disclosure are directed to various configurations for remote radio heads and include configurations in which the remote radio heads share the same cell identification as the macro cell as well as configurations in which the remote radio heads use cell IDs different from the macro cell. For example, in some scenarios, the remote radio heads share the same cell identification (ID) as the macro cell and transmit the same common reference signal (CRS) as the macro cell. The downlink control channels, such as PDCCH, that use CRS are transmitted by the macro cell and all remote radio heads that transmit CRS. In this configuration, the UEs see a single cell. Additionally, in alternate configurations, the remote radio heads use different cell IDs than that of the macro cells. More particularly, the remote radio heads may have colliding common reference signals (CRSs) or the remote radio heads may use different cell IDs, some of which may generate non colliding reference signals. The UEs in the remote radio head region 602 view the remote radio head 610b as the stronger cell and the macro cell 610a as the interferer. The UEs in the range expansion region 603 may not even detect the remote radio head 610b because the remote radio head's received signal is weaker than the signal from the macro cell 610a. Range expansion may be enabled in several approaches. For example, the range expansion UEs receive downlink control (e.g., PDCCH, PHICH, etc.) from the macro eNodeB and data from the remote radio head and/or macro cell.

In some aspects, the macro cell and the remote radio head jointly serve the UEs. For example, the UEs may receive control from the macro cell and data from the remote radio head, etc. In one aspect, the serving cell is defined as the cell ID whose CRS is monitored for: time tracking loop, frequency tracking loop, and/or decoding of CRS based channels (e.g., PDCCH, PHICH, PCFICH, etc.).

Full cell splitting gains on downlink data may be obtained if the macro cell clears some downlink resources on which multiple remote radio heads can transmit simultaneously to their UEs. Uplink transmissions, including data, control and sounding reference signal (SRS) transmissions, may be configured to obtain cell splitting gains. For example, cell splitting gains are possible on uplink transmissions where the remote radio head UEs and possibly even macro UEs transmit on the same time-frequency resources.

In some scenarios, multiple stations may transmit pilot signals using the same sequence causing a single frequency network (SFN) effect while data is transmitted independently. This may cause mismatch in the channel and interference estimates as pilots and data effectively see different channels. In other aspects, multiple stations transmit non-orthogonal pilots causing interference to other transmissions. In some aspects of the present disclosure, the interference may be reduced by using resource partitioning (FDM/TDM, etc.), allowing cells to transmit using scrambling sequences corresponding to other stations, and by defining new scrambling sequences and partitioning them across different stations, etc.

In general, the uplink transmission parameters, such as the scrambling sequence, orthogonal cover codes, and cyclic shifts are derived from the cell ID of the serving cell for downlink, and other UE specific/cell specific parameters. When the remote radio heads and the macro eNodeBs share the same cell ID, similar scrambling sequences may be used across the entire region covered by macro eNodeBs and remote radio heads. For example, for all remote radio head range expansion UEs simultaneously transmitting, the same pilots may be transmitted from two UEs and result in an SFN effect of pilots at the remote radio heads. This may impact the demodulation performance as the channel estimated from the pilots is the sum of channels from the two UEs while data only sees channel from one UE. In addition, the estimated interference from the pilots alone does not include the interference caused by the second UE, but the received signal corresponding to the data transmission from one UE would include interference from the second UE. These issues may also affect control channels messages like ACK (acknowledge) and channel quality indicator (CQI) because their payload is small, leading to a possible SFN effect even in the data portion.

One aspect of the present disclosure is directed to ensure that UEs transmitting at the same time do not have the same pilot on uplink, where the pilot signal is for demodulation. In one aspect, the remote radio heads have the same cell ID as the macro cell. Various configurations may be implemented to configure UEs so the UEs do not have the same pilot. In particular, specific parameters of each UE may be configured. Additionally, parameters derived out of the downlink grant, allocated bandwidth on the uplink, and allocated resource blocks on the downlink may also be configured. The parameters that control the uplink transmissions may be planned across the entire cell (e.g., macro eNodeBs and RRHs) to avoid collisions or at least avoid such collisions for pairs of UEs where one may be causing significant interference on the uplink to the other.

In another aspect, where the remote radio heads have the same cell ID as the macro cell, the UEs may be instructed to use a different cell ID, for example, a virtual RRH cell ID. Optionally, the UEs may be instructed to use other cell specific parameters, such as those parameters derived from the uplink/downlink grant (e.g., PUCCH offset, etc.). Further, the UEs may be instructed to use other UE specific parameters, such as those derived from the uplink/downlink grant. Some of these parameters may be semi static while others maybe dynamic and included in the downlink/uplink grant.

In another aspect, where the remote radio heads have the same cell ID as the macro cell, a new downlink control channel, such as relay-physical downlink control channel (R-PDCCH) may be used by different remote radio heads simultaneously. The R-PDCCH is decoded using its own pre-coded pilot (i.e., UE-RS) as opposed to being decoded with a CRS based sequence. The UE may be signaled as to which cell ID and/or scrambling sequence to search for when it looks for its control channel. The aspects discussed above with reference to shared cell IDs may be applied when the RRH cell ID is different from the cell ID of the macro cell.

In another aspect, the remote radio heads use cell IDs different than the macro cell. The range expansion UEs may obtain control information from the macro cell and use the macro cell parameters for uplink transmission. To obtain range expansion gains on uplink communications, the remote radio heads receive the uplink transmissions of the UEs in their range expansion region. The remote radio heads handle uplink transmissions corresponding to non range expansion UEs that transmit using the uplink parameters corresponding to the remote radio heads, while the range expansion UEs transmit corresponding to the parameters of the macro cell. This may lead to the remote radio heads decoding non orthogonal transmissions from different UEs using the same resources.

In one aspect, for the remote radio heads having cell IDs different from the macro cell, the UEs are instructed which cell ID to use for uplink transmissions. For example, the remote radio head range expansion UEs may be instructed to use the macro cell ID while receiving downlink control, but to use the cell ID of the associated remote radio head for uplink transmissions.

Optionally, in another aspect, for remote radio heads having cells IDs different from the macro cell, the range expansion UE's uplink control information is received and decoded by the macro cell while the regular remote radio head UEs uplink control information is received and decoded by the remote radio head.

In yet another aspect, where the remote radio heads have cell IDs different from the macro cell, the uplink control information may be received and decoded by the remote radio head, and the range expansion UEs and the regular remote radio head UEs control/data channels are partitioned via FDM/TDM. In other words, orthogonality is achieved with resources rather than scrambling codes.

The downlink transmission may be considered in another aspect where the UEs served by the remote radio heads on the downlink and receive control from the macro cell may expect the scrambling sequence of the macro cell to be used. The remote radio head may transmit with the scrambling sequence of the macro cell to keep things transparent to the UE even if they have different cell IDs. However, because there are a limited number of downlink UE-reference signal (UE-RS) scrambling sequences defined for a given cell, pilot collisions for the UE-RS based transmissions may occur when multiple remote radio heads use the same resources to serve their range expansion UEs. Pilot collisions may also occur for UEs simultaneously being served from different remote radio heads that share the same cell ID as the macro cell.

In one aspect, additional scrambling sequences may be defined for a given cell ID to configure UEs of different remote radio heads that are simultaneously served. For example, each remote radio head is assigned a different set of scrambling sequences. In another aspect, the remote radio heads may have some scrambling sequences in common but the scheduler attempts to assign different scrambling sequences for neighboring remote radio head transmissions in situations where the remote radio head UEs expect to see significant interference from other remote radio heads.

In another aspect, the UE is configured to decode the UE-RS with a cell ID different from the cell ID the UE uses for control channel decoding. For example, the UE may use the remote radio head cell ID for UE-RS descrambling when it is in range expansion mode although it receives control information from the macro cell based on the macro cell ID.

Another aspect considers remote radio heads having cell IDs different from the macro cell, where the remote radio head uses channel state information-reference signals (CSI-RSs). The UE may be informed of UE specific information, such as the CSI-RS location of the remote radio head, instead of the CSI-RS location of the macro cell. By default the UE uses the scrambling sequence corresponding to the macro cell ID for descrambling, but the remote radio head transmits CSI-RS using scrambling derived from its own cell ID.

In one aspect, the remote radio head is configured to transmit CSI-RS using the scrambling sequence of the macro cell. Additionally, the remote radio head may be configured to also transmit CSI-RS using its own cell ID. In another aspect, the UE is instructed which cell ID to use for CSI-RS descrambling. The cell ID may be different from the cell ID the UE uses for control (e.g., PDCCH/PHICH) decoding.

Another aspect considers remote radio heads having a different cell ID relative to the macro cell. The sequences used for SRS (sounding reference signal) transmission by the remote radio head UEs will not be orthogonal to the macro UEs SRS signal or to each other without some improved configuration. The neighboring remote radio heads will either suffer higher mutual SRS interference among themselves or between each remote radio head and the macro cell.

In one aspect, complete TDM/FDM SRS resource partitioning is used among remote radio heads and between each remote radio head and the macro cell. There may be some resource reuse pattern allowance for distant remote radio heads to permit use of the same resources.

Alternatively, in another aspect, the range expansion UEs are instructed to use a different cell ID (e.g., RRH instead of macro) and other cell specific parameters (e.g., RRH instead of macro) for uplink SRS transmissions.

In a further aspect, both range expansion UEs and RRH UEs may be instructed to use the cell ID of the macro cell. In this case, the RRH cell ID is available for other purposes. Additionally, in another aspect, the techniques described above also apply to a network including a coordinated multipoint (CoMP) scheme.

Figure 7:
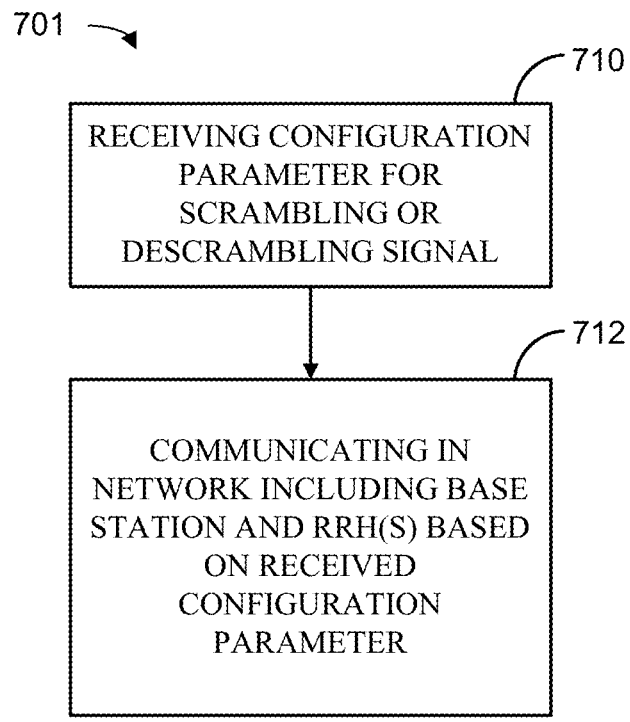
FIG. 7 is a block diagram illustrating a method for configuring remote radio heads.

FIG. 7 illustrates a method 701 for configuring UEs in a network having remote radio heads. A configuration parameter is received and is for scrambling or descrambling a signal for which a larger number of scrambling sequences are defined for a particular cell ID for UEs of a new release. In block 712, a UE communicates in the network based at least in part on the received configuration parameter.

In one configuration, the UE 120 is configured for wireless communication including means for receiving. In one aspect, the receiving means may be the controller/processor 480 and memory 482; receive processor 458, demodulators 454a-454r, and/or antenna 452a-452r configured to perform the functions recited by the receiving means. The UE 120 is also configured to include means for communicating. In one aspect, the communicating means may be the controller/processor 480, memory 482, transmit processor 464, modulators/demodulators 454a-454r; receive processor 458, and/or the antenna 452a-452r configured to perform the functions recited by the communicating means. In another aspect, the aforementioned means may be any module or any apparatus configured to perform the functions recited by the aforementioned means.

Figure 8:
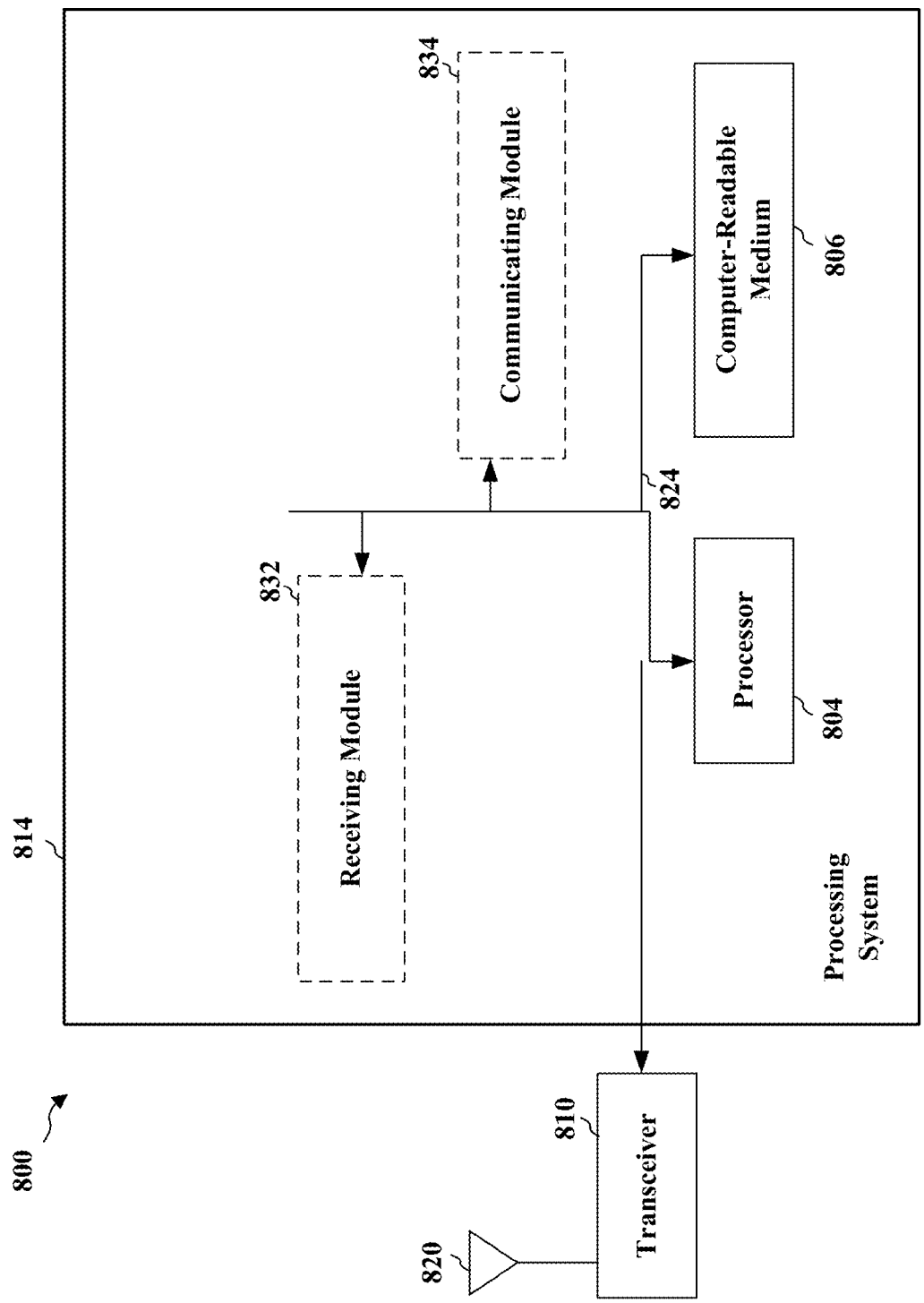
FIG. 8 is a conceptual data flow diagram illustrating the data flow between different modules/means/components in an exemplary apparatus.

FIG. 8 is a diagram illustrating an example of a hardware implementation for an apparatus 800 employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware modules, represented by the processor 804 the modules 832, 834, and the computer-readable medium 806. The bus 824 may also link various other circuits such as timing sources, peripherals, voltage regulators, and power management circuits, which are well known in the art, and therefore, will not be described any further.

The apparatus includes a processing system 814 coupled to a transceiver 810. The transceiver 810 is coupled to one or more antennas 820. The transceiver 810 enables communicating with various other apparatus over a transmission medium. The processing system 814 includes a processor 804 coupled to a computer-readable medium 806. The processor 804 is responsible for general processing, including the execution of software stored on the computer-readable medium 806. The software, when executed by the processor 804, causes the processing system 814 to perform the various functions described for any particular apparatus. The computer-readable medium 806 may also be used for storing data that is manipulated by the processor 804 when executing software.

The processing system includes a receiving module 832, and a communicating module 834. The receiving module 832 can receive a configuration parameter for scrambling or descrambling signal a signal for which a larger number of scrambling sequences are defined for a particular cell ID for UEs of a newer release. The communicating module 834 can communicate with a base station and/or remote radio head based on the received configuration parameter. The modules may be software modules running in the processor 804, resident/stored in the computer readable medium 806, one or more hardware modules coupled to the processor 804, or some combination thereof. The processing system 814 may be a component of the UE 120 and may include the memory 482, the transmit processor 464, the receive processor 458, the modulators/demodulators 454a-r, the antenna 452a-r, and/or the controller/processor 480.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    receiving a configuration parameter for scrambling or descrambling a signal for which a larger number of scrambling sequences are defined for a particular cell ID for UEs of a newer release; and
    communicating in a network including a base station and at least one remote radio head (RRH), based at least in part on the received configuration parameter.

2. The method of claim 1, in which the received configuration parameter includes:
    a cell identification different from the cell identification of the base station;
    a physical uplink control channel offset value; or
    a user equipment (UE) specific parameter.

3. The method of claim 1, in which the received configuration parameter is a UE-RS (reference signal) scrambling sequence; and in which the communicating further comprises decoding a received signal based-on the UE-RS.

4. The method of claim 1, in which a remote radio head (RRH) has a cell identification different from the base station, and in which the configuration parameter is a cell ID of the remote radio head.

5. The method of claim 4, in which the communicating comprises scrambling an uplink data transmission, uplink demodulation reference signal and/or sounding reference signals (SRSs) based at least in part on the cell ID of the RRH.

6. The method of claim 4, in which the communicating comprises descrambling a downlink demodulation reference signal, a downlink channel state information reference signal (CSI-RS), a user equipment reference signal (UE-RS) and/or a downlink data transmission based at least in part on the cell ID of the RRH.

7. The method of claim 1, in which the configuration parameter comprises resource partitioning information, and in which the communicating further comprises transmitting sounding reference signals (SRSs), control channels and/or data channels based at least in part on the resource partitioning information.

8. The method of claim 1, in which the configuration parameter is received at least in part using radio resource control (RRC) signaling.

9. The method of claim 1, in which the configuration parameter is received at least in part through downlink and uplink grants.

10. The method of claim 1, in which a UE is configured to use a particular scrambling sequence based on a remote radio head (RRH) with which it is associated.

11. The method of claim 10, in which the received configuration parameter comprises a scrambling sequence corresponding to a cell ID of the associated remote radio head.

12. The method of claim 11, in which the communicating further comprises communicating using the scrambling sequence corresponding to the associated remote radio head.

13. The method of claim 1, in which the signal is a channel state information reference signal (CSI-RS), a user equipment reference signal (UE-RS) for data demodulation, a UE-RS for downlink control demodulation, downlink data, downlink control, a sounding reference signal (SRS), a demodulation reference signal (DM-RS) for uplink demodulation, a DM-RS for uplink control, uplink control, and/or uplink data.

14. An apparatus for wireless communication, comprising:
a memory; and
at least one processor coupled to the memory, the at least one processor being configured:
to receive a configuration parameter for scrambling or descrambling a signal for which a larger number of scrambling sequences are defined for a particular cell ID for UEs of a newer release; and
to communicate in a network including a base station and at least one remote radio head (RRH), based at least in part on the received configuration parameter.

15. The apparatus of claim 14, in which the received configuration parameter includes:
a cell identification different from the cell identification of the base station;
a physical uplink control channel offset value; or
a user equipment (UE) specific parameter.

16. The apparatus of claim 14, in which the received configuration parameter is a UE-RS (reference signal) scrambling sequence; and in which the communicating further comprises decoding a received signal based-on the UE-RS.

17. The apparatus of claim 14, in which a remote radio head (RRH) has a cell identification different from the base station, and in which the configuration parameter is a cell ID of the remote radio head.

18. The apparatus of claim 17, in which the processor is further configured to communicate by scrambling an uplink data transmission, uplink demodulation reference signal and/or sounding reference signals (SRSs) based at least in part on the cell ID of the remote radio head (RRH).

19. The apparatus of claim 17, in which the processor is further configured to communicate by descrambling a downlink demodulation reference signal, a downlink channel state information reference signal (CSI-RS), a user equipment reference signal (UE-RS) and/or a downlink data transmission based at least in part on the cell ID of the RRH.

20. The apparatus of claim 14, in which the configuration parameter comprises resource partitioning information, and in which the communicating further comprises transmitting sounding reference signals (SRSs), control channels and/or data channels based at least in part on the resource partitioning information.

21. The apparatus of claim 14, in which the configuration parameter is received at least in part using radio resource control (RRC) signaling.

22. The apparatus of claim 14, in which the configuration parameter is received at least in part through downlink and uplink grants.

23. The apparatus of claim 14, in which a UE is configured to use a particular scrambling sequence based on a remote radio head (RRH) with which it is associated.

24. The apparatus of claim 23, in which the received configuration parameter comprises a scrambling sequence corresponding to a cell ID of the associated remote radio head.

25. The apparatus of claim 24, in which the processor is further configured to communicate using the scrambling sequence corresponding to the associated remote radio head.

26. The apparatus of claim 14, in which the signal is a channel state information reference signal (CSI-RS), a user equipment reference signal (UE-RS) for data demodulation, a UE-RS for downlink control demodulation, downlink data, downlink control, a sounding reference signal (SRS), a demodulation reference signal (DM-RS) for uplink demodulation, a DM-RS for uplink control, uplink control, and/or uplink data.

27. A computer program product for wireless communication in a wireless network, comprising:
a non-transitory computer-readable medium having non-transitory program code recorded thereon, the program code comprising:
program code to receive a configuration parameter for scrambling or descrambling a signal for which a larger number of scrambling sequences are defined for a particular cell ID for UEs of a newer release; and
program code to communicate in a network including a base station and at least one remote radio head (RRH), based at least in part on the received configuration parameter.

28. An apparatus for wireless communication, comprising:
means for receiving a configuration parameter for scrambling or descrambling a signal for which a larger number of scrambling sequences are defined for a particular cell ID for UEs of a newer release; and
means for communicating in a network including a base station and at least one remote radio head (RRH), based at least in part on the received configuration parameter.

* * * * *